(12) United States Patent
Goto et al.

(10) Patent No.: US 6,754,005 B2
(45) Date of Patent: Jun. 22, 2004

(54) LENTICULAR LENS SHEET

(75) Inventors: Masahiro Goto, Shinjuku-Ku (JP); Kumpei Oda, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 122 days.

(21) Appl. No.: 10/121,716

(22) Filed: Apr. 15, 2002

(65) Prior Publication Data
US 2002/0149846 A1 Oct. 17, 2002

(30) Foreign Application Priority Data
Apr. 16, 2001 (JP) .......................................... 2001-116657

(51) Int. Cl.$^7$ .......................... G03B 21/60; G03B 27/10
(52) U.S. Cl. ........................................ 359/456; 359/626
(58) Field of Search ................................ 359/456, 457, 359/626, 455, 619

(56) References Cited

U.S. PATENT DOCUMENTS

| | | | | |
|---|---|---|---|---|
| 3,830,556 A | * | 8/1974 | Bratkowski | 359/456 |
| 4,666,248 A | * | 5/1987 | van de Ven | 359/457 |
| 5,477,380 A | * | 12/1995 | Watanabe et al. | 359/457 |
| 5,513,037 A | * | 4/1996 | Yoshida et al. | 359/457 |
| 5,751,478 A | * | 5/1998 | Yoshimura et al. | 359/457 |

* cited by examiner

Primary Examiner—Christopher Mahoney
(74) Attorney, Agent, or Firm—Parkhurst & Wendel, L.L.P.

(57) ABSTRACT

This invention is a lenticular lens sheet including an incidence plane that has a plurality of lens surfaces and an outgoing plane. A focal length at a center portion of each of the plurality of lens surfaces is longer. A focal length at an edge portion of each of the plurality of lens surfaces is shorter.

16 Claims, 4 Drawing Sheets

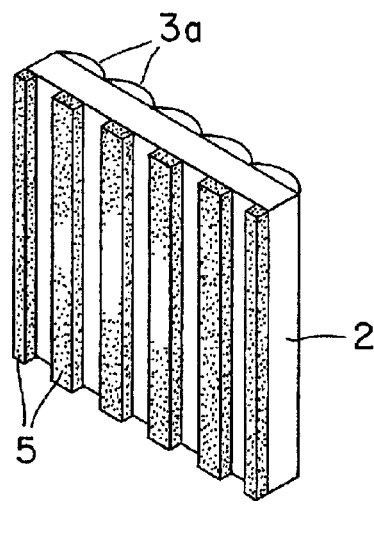
F I G. 3(a)
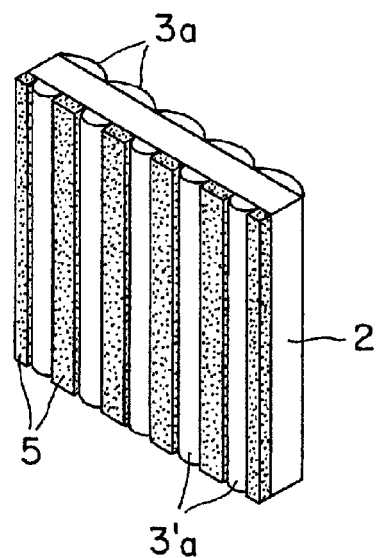
F I G. 3(b)
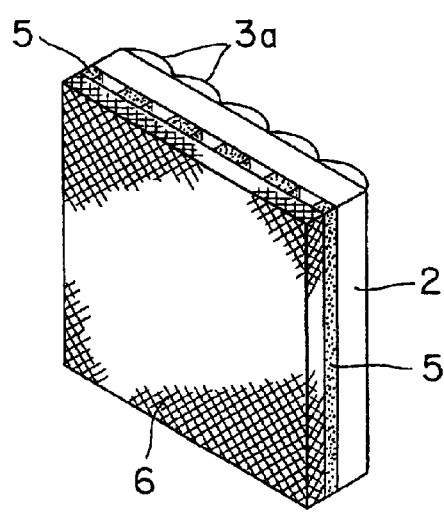
F I G. 4

LENTICULAR LENS SHEET

BACKGROUND OF THE INVENTION

1. Field of the Invention

This invention relates to a lenticular lens sheet for a transmissive projection screen in a projection-type of television set, which projects light of an image incident on a backside thereof onto a front side thereof.

In addition, in particular, this invention relates to a lenticular lens sheet for a transmissive projection screen, which projects light of an image from a single image displaying source such as a liquid-crystal displaying unit or a digital micro-mirror device (abbreviated name; DMD).

2. Description of the Related Art

Conventionally, for a large television set, three CRT of red, green and blue are used, and their images are enlarged and projected on a screen through a projecting lens system. In addition, recently, a liquid-crystal projection type of television set has been developed, wherein three liquid-crystal displaying panels of red, green and blue are used and wherein their images are composed and displayed by a dichroic mirror. Furthermore, there is a projection type of television set wherein a liquid-crystal panel or a DMD panel is used and wherein a color display is achieved in a field-sequential manner.

A conventional screen for a CRT has: lenticular lenses on both surfaces thereof, and a black stripe (light blocking stripe) on an observed surface in order to block reflection of any external light. If an LCD panel or a DMD panel is used, as an image source is single, the lens on the observed surface is unnecessary. Thus, a lenticular lens sheet having lenticular lenses on only one surface of a light-source side has been used.

When such a lenticular lens sheet (or a screen having such a lenticular lens sheet) is used, an image observed by an observer should be bright. Especially, when the image source is an LCD panel or a DMD panel, there is a limit to enhancement of illumination of a or more lamps themselves because of costs or lives thereof. Thus, it is requested to enhance the gain of a screen.

In addition, a lenticular lens with a black stripe, which has been used conventionally, is designed in such a manner that a concentrated focal point is in a predetermined area in the vicinity of the black stripe. Thus, with respect to a diffusion characteristic thereof, a ½ diffusion angle (an angle range that can obtain ½ luminance with respect to luminance at a front area of the screen) is wide, but a peak gain is low. In addition, when an angle from the front area is over ±50°, the gain rapidly declines so that a cutoff happens. Especially, in a lenticular lens sheet with a black stripe of a fine pitch, in order to prevent the cutoff, it is necessary to make positional accuracy in forming the black stripe very severe.

SUMMARY OF THE INVENTION

In this invention, an object is to provide a lenticular lens sheet whose peak gain can be enhanced and which can avoid any cutoff. In addition, for a lenticular lens sheet with a black stripe of a fine pitch, it is also an object to facilitate a control, in particular a positional control, in forming the black stripe.

According to the inventors, instead of concentration of focal points by respective points on a lens surface into one point, when focal lengths by the respective points continuously vary from the center of the lens surface toward edges of the lens surface, in particular when the focal lengths shorten toward the edges of the lens surface, if a black stripe is formed in such a manner an area including a focal point by the edges of the lens surface is left as an opening, it can be prevented that light (beams) through the respective points on the lens surface is blocked by the black stripe. In addition, in the case, reflection of external light can be sufficiently reduced by means of the black stripe.

This invention is a lenticular lens sheet comprising: an incidence plane that has a plurality of lens surfaces; and an outgoing plane; wherein a focal length at a center portion of each of the plurality of lens surfaces is longer, and a focal length at an edge portion of each of the plurality of lens surfaces is shorter.

According to the feature, since the focal length at the center portion of each of the plurality of lens surfaces is longer, that is, since refraction at the center portion of each of the plurality of lens surfaces is restrained, luminance at a front area can be enhanced, that is, the peak gain can be enhanced. In addition, if a light blocking portion is formed on the basis of a refracted beam at the edge portion of each of the plurality of lens surfaces, a lenticular lens sheet with a light blocking portion that generates no cutoff can be provided.

Preferably, the outgoing plane is flat. In the case, contrast can be enhanced. In addition, if a hard coating process or a reflection-prevention coating process is conducted to the outgoing plane by an application or the like, the effect may be outstanding, so that the roughness of an image may be reduced and the feel of the image may be also improved. In addition, it is easy to clean the surface of the outgoing plane.

Preferably, in each of the plurality of lens surfaces (in each lens unit), focal lengths at respective points from the center portion to the edge potion shorten in order from the center portion toward the edge potion. More preferably, in each of the plurality of lens surfaces, focal lengths at respective points from the center portion to the edge potion continuously shorten from the center portion toward the edge potion. In the case, each of the plurality of lens surfaces may have a sectional contour consisting of a convex curve.

In addition, preferably, in a sectional contour of each of the plurality of lens surfaces, when a curvature radius at the center portion of each of the plurality of lens surfaces is represented by R, an angle formed by a tangential line at the edge portion of each of the plurality of lens surfaces and a tangential line at the center portion of each of the plurality of lens surfaces is represented by $\theta$, a pitch of an arrangement of the plurality of lens surfaces is represented by P, and a thickness and a refractive index of a lens part defining the plurality of lens surfaces are represented by H and n, a following expression $$\tan\{\sin^{-1}(\sin\theta/n)-\theta+(\pi/2)\} < 2\times\{n\times R/(n-1)-H\}/P$$

is satisfied.

If the above expression is utilized, a lenticular lens sheet having some advantage can be efficiently designed and manufactured.

Preferably, a pitch of an arrangement of the plurality of lens surfaces is 0.001 mm to 0.3 mm. In the case, if the lenticular lens sheet is used together with an image source of a fine pitch, it can be prevented that a moire pattern appears.

Preferably, a lens part defining the plurality of lens surfaces is layered onto a transparent substrate.

For example, the lens part can be easily formed by hardening a liquid transparent resin or the like.

Preferably, the lens part defining the plurality of lens surfaces consists of an ionization radiation hardening resin.

In the case, the shape of the lens part can be formed more precisely. In addition, the lens part can be easily formed even on a resin film.

In addition, preferably, a light blocking portion is formed in a thickness direction of the lenticular lens sheet and in a planar direction of the lenticular lens sheet in such a manner that at least a beam through the edge portion of each of the plurality of lens surfaces is not blocked by the light blocking portion.

In the case, it is secured that a beam incident on and refracted by the edge portion of the lens surface outgoes through the lenticular lens sheet. Thus, with respect to all diffusion angles, a beam can pass through the lenticular lens sheet. Even if a position of the light blocking portion is slightly incorrect or shifted, a beam can still pass at a small diffusion angle. That is, the influence is small on the beam. In a conventional lenticular lens sheet wherein the focal points are concentrated into one point, if a position of the light blocking portion is slightly incorrect or shifted, this has great influence on beam passage (outgoing) with respect to all diffusion angles.

Preferably, the light blocking portion is formed between a level of a focal point corresponding to the center portion of each of the plurality of lens surfaces and a level of a focal point corresponding to the edge portion of each of the plurality of lens surfaces, with respect to the thickness direction of the lenticular lens sheet. In the case, a positioning step for forming the light blocking portion can be easily conducted, and positional accuracy for forming the light blocking portion can be easily secured.

Preferably, when parallel beams are incident on each of the plurality of lens surfaces and luminance at a front area of the outgoing plane is represented by B, an area having luminance not less than B/2 includes ±15° to ±40° from the front area, and an area having luminance not less than B/10 further includes ±15° from the area having luminance not less than B/2.

In the case, a lenticular lens sheet with a light blocking portion having a high peak gain and a wide view angle can be provided.

Preferably, a width of the light blocking portion is 40% to 90% of a pitch of an arrangement of the plurality of lens surfaces. In the case, since the existence rate of the light blocking portion is high, reflection of external light on an observed side can be restrained more surely.

Preferably, the light blocking portion consists of a silver-salt photo emulsion layer that has been developed. In the case, if the silver-salt photo emulsion layer has been exposed by light from a lens-surface side and then developed, the light blocking portion having a high reflection-preventing effect can be formed at high positional accuracy to geometry of the lens.

The above lenticular lens sheet can be used as a backside-projecting type of screen.

In the above screen, the lenticular lens sheet may have a light-diffusion effect. For example, a backside-projecting type of screen with a light-diffusion effect in a direction perpendicular to the light-diffusion direction by means of the original lens part may be provided.

In addition, in the above screen, a light-diffusion element is further provided at least an outgoing part of the screen. The outgoing part means a portion of the outgoing plane except the light blocking portion. The light-diffusion element may be a sheet in which a light-diffusion agent has been dispersed.

BRIEF DESCRIPTION OF THE DRAWINGS

FIGS. 3a and 3b are perspective views of lenticular lens sheets, respectively;

FIG. 4 is a perspective view of a lenticular lens sheet on which a light-diffusion sheet is layered.

BEST MODE FOR CARRYING OUT THE INVENTION

Embodiments of the invention are explained in more detail with reference to the drawings.

FIGS. 1 to 4 show embodiments of a lenticular lens sheet and a screen according to the invention, respectively.

Figure 1:
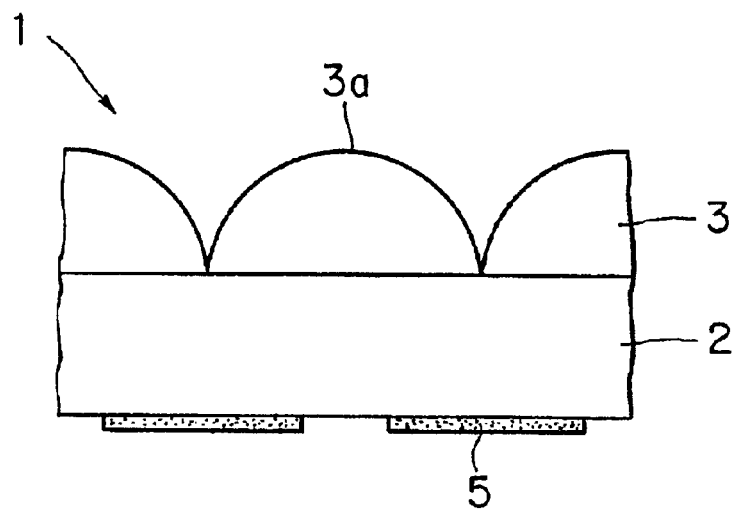
FIG. 1 is a sectional view of an embodiment of a lenticular lens sheet according to the invention.

FIG. 1 is a sectional view of an embodiment of a lenticular lens sheet according to the invention. As shown in FIG. 1, a lenticular lens sheet 1 of this embodiment comprises a transparent substrate 2 and a lenticular lens layer 3 defining a lot of lenticular lens surfaces 3a layered on a surface (an upper surface in the drawing) of the transparent substrate 2. The other surface (a lower surface in the drawing) of the transparent substrate 2 is a flat surface. A light blocking portion (layer) 5 is layered on the other surface of the transparent substrate 2 at a non-focused area.

For the lenticular lens sheet 1 shown in FIG. 1, it is preferable that the side of the lenticular lens surfaces 3a is used as an incidence plane for a projection light and that the side of the light blocking portion 5 is used as an outgoing plane for the projection light. Herein, a surface on the side of the light blocking portion 5 used as an outgoing plane is flat, that is, no lens surface is formed thereon. This leads to the following effects.

At first, diffusion and reflection at the outgoing plane can be reduced. Thus, contrast can be enhanced. In addition, it is easy to conduct a hard coating process or a reflection-prevention coating process to the outgoing plane. That is, since the respective coating processes can be conducted at a desired coating-thickness without unevenness, the coating processes can have a great effect. Furthermore, it is easy to finish the surface of the outgoing plane as a mirror surface. In the case, the roughness of an image may be reduced and the feel of the image may be improved. In addition, it is easy to clean the surface of the outgoing plane.

Figure 2:
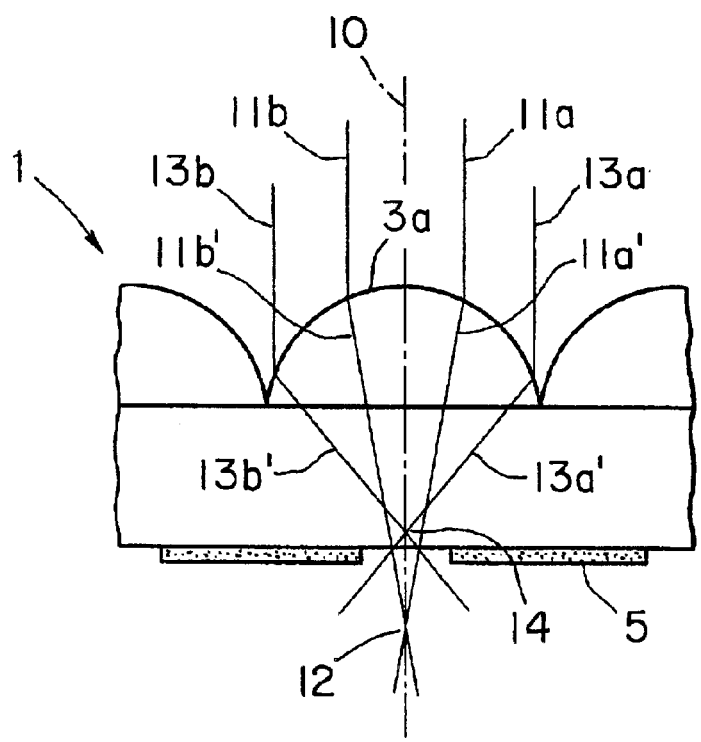
FIG. 2 is a view for explaining a function of the lenticular lens sheet shown in FIG. 1 and a position of a light blocking portion.

FIG. 2 is a view for explaining a function of the lenticular lens sheet of FIG. 1 and a position of a light blocking portion. As shown in FIG. 2, an oprical axis 10 of each lenticular lens surface 3a coincides with a normal line (perpendicular line) at a center of each lenticular lens surface 3a. As shown in FIG. 2, beams 11a and 11b incident on a lenticular lens surface 3a parallel to the optical axis 10 at two points in vicinity of a center of the lenticular lens surface 3a, the two points being symmetric with respect to the center of the lenticular lens surface 3a, are refracted by the lenticular lens surface 3a (lenticular lens layer 3). The refracted beams 11a' and 11b' cross with each other at a focal point 12 below the lenticular lens sheet 1.

In addition, beams 13a and 13b incident on the lenticular lens surface 3a parallel to the optical axis 10 at two points in vicinity of respective edges of the lenticular lens surface 3a (at two points respectively close to neighboring lenses on both sides), the two points being also symmetric with respect to the center of the lenticular lens surface 3a, are also refracted by the lenticular lens surface 3a (lenticular lens layer 3). The refracted beams 13a' and 13b' cross with each other at a focal point 14 in the transparent substrate 2 of the lenticular lens sheet 1.

The refracted beams 13a' and 13b' of the beams 13a and 13b incident on the lens surface 3a at the points in the vicinity of the edges of the lens surface 3a go through the focal point 14, and then cross with the refracted beams 11a' and 11b' of the beams 11a and 11b incident on the lens surface 3a at the points in the vicinity of the center of the lens surface 3a.

Thus, as shown in FIG. 2, an area from the cross point of the refracted beams 13a' and 11b' to the cross point of the refracted beams 13b' and 11a' is left as an opening, and the other area is covered by the light blocking portion 5. In this arrangement, the light blocking portion 5 blocks very less beams that should outgo (pass through the lenticular lens sheet).

As described above, the light blocking portion 5 of this embodiment is formed between a level of a focal point 12 corresponding to the center portion of the lens surface 3a and a level of a focal point 14 corresponding to the edge portions of the lens surface 3a, with respect to the thickness direction of the lenticular lens sheet 1. In the case, a wider light blocking portion can be formed. In other words, a width of the light blocking portion with respect to a pitch of the lenses can be made greater. This can enhance the ability of the light blocking portion in reducing reflection of external light on an observed side of the lenticular lens sheet.

Herein, "between (a level of) a focal point by the center portion of the lens surface and (a level of) a focal point by the edge portions of the lens surface" may include "(a level of) a focal point by the center portion of the lens surface" and "(a level of) a focal point by the edge portions of the lens surface". That is, a part of the light blocking portion 5 is allowed to reach either focal point (level).

An effect of this embodiment is further explained as follows.

If another light blocking portion having the same wide opening as that in the light blocking portion 5 of this embodiment is formed at a level near to the focal point 12, at which the refracted beams 11a' and 11b' of the beams 11a and 11b incident on the lens surface 3a at the points in the vicinity of the center of the lens surface 3a cross with each other, instead of the light blocking portion 5, that is, if a level at which the light blocking portion is formed is lowered, the refracted beams 13a' and 13b' of the beams 13a and 13b incident on the lens surface 3a at the points in the vicinity of the edges of the lens surface 3a may be blocked by the light blocking portion. Thus, the gain at a diffusion angle over ±50° may be reduced.

When another light blocking portion is formed, instead of the light blocking portion 5, at a level higher than the level (A) shown in FIG. 2, for example at a level (B) near to the focal point 14, or at a level (C) near to the cross point of the refracted beams 11b' and 13b' and the cross point of the refracted beams 11a' and 13a', if the light blocking portion is formed so as not to block the refracted beams at its own level, the same effect as the above embodiment shown in FIG. 2 can be achieved. However, the refracted beams 11a, and 11b' of the beams 11a and 11b incident on the lens surface 3a at the points in the vicinity of the center of the lens surface 3a are closer to each other at a lower position, above the focal point 12. Thus, in order to form a wider light blocking portion, the level (A) is most advantageous, the level (B) is less advantageous than the level (A), and the level (C) is less advantageous than the level (B).

In practice, preferably, points inside from edges of a condensing lens part by 1% of the pitch of the arrangement of the lenses are considered as "the points in the vicinity of the edges" of the lens surface 3a. Then, preferably, a focal point of the incidence beams at "the points in the vicinity of the edges" is found, and the thickness of the lens layer 3 and the thickness of the transparent substrate 2 are determined in such a manner a surface of the outgoing plane (not including any lens surface) of the lenticular lens sheet 1 is located at a vicinity of the found focal point, or at a level more outside (lower in the drawing) than the found focal point and more inside (higher in the drawing) than a focal point of incidence beams at points in the vicinity of the center of the lens surface 3a.

Herein, the lenticular lens sheet of this embodiment has a feature in a sectional contour of each lens surface 3a. In this embodiment, a focal length at the center portion of the lens surface 3a is longer, and focal lengths at respective points from the center portion to the edge potions continuously (or progressively) shorten from the center portion toward the edge potions. More concretely, when a curvature radius at the center portion of the lens surface 3a is represented by R, an angle formed by a tangential line at an edge portion of the lens surface 3a and an upper surface of the transparent substrate 2 (which is parallel to the tangential line at the center portion of the lens surface 3a and the outgoing plane) is represented by θ (radian), a pitch of an arrangement of the plurality of lens surfaces is represented by P, a thickness of the lens layer 3 is represented by H, and a refractive index of a material for the lens layer 3 is represented by n, a following expression is satisfied.

$$\tan\{\sin^{-1}(\sin\theta/n)-\theta+(\pi/2)\}<2\times\{n\times R/(n-1)-H\}/P$$

The above expression has been obtained by the inventors as follows.

Figure 5:
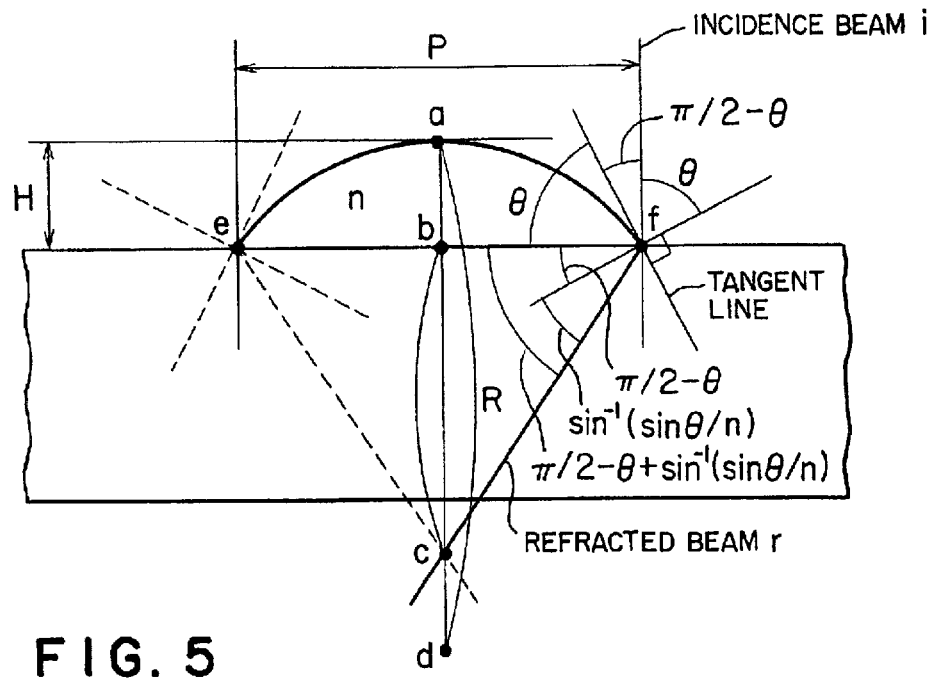
FIG. 5 is a view for explaining a refraction of a beam incident on an edge portion of a lens surface.

FIG. 5 is a view for explaining a refraction of a beam incident on an edge portion of a lens surface. When an angle formed by a tangential line at a point f of a right edge portion of the lens surface and an upper surface of the transparent substrate 2 is represented by θ, with respect to an incidence beam i on the point f and a refracted beam r by the point f, the following Snell's expression is satisfied.

$$n_1 \sin\theta = n_2 \sin\theta_r$$

Herein, $n_1$ represents a refractive index of air. Approximately, $n_1=1$ is satisfied. In addition, $n_2$ represents a refractive index of a material for the lens. For simplification, when the refractive index $n_2$ of a material for the lens is represented by n, the following expression is satisfied.

$$\sin\theta_r = \sin\theta/n$$

Then, the following expression is obtained therefrom.

$$\theta_r = \sin^{-1}(\sin\theta/n)$$

The refracted beam goes in a direction defined by an angle of $\theta_r$. The refracted beam crosses with another refracted beam (shown by a broken line in the drawing) by a point e of a left edge portion of the lens surface (which is the symmetrical point of the point f with respect to the center of the lens surface), at a focal point c below the center portion of the lens surface.

The position of the focal point a can be found by a tangent of a segment bf having a length half a lens pitch P and an angle ∠cfb, as the segment bc is one side of a right triangle fbc. Herein, as shown in FIG. 5, the angle ∠cfb is the sum of $\theta_r$ and $\pi/2-\theta$. That is, the expression is satisfied.

Angle $\angle cfb = \sin^{-1}(\sin \theta/n) + \pi/2 - \theta$

Thus, the length $L_{bc}$ of the segment bc is represented by the following expression.

$L_{bc} = (P/2) \times \tan\{\sin^{-1}(\sin \theta/n) + \pi/2 - \theta\}$

Figure 6:
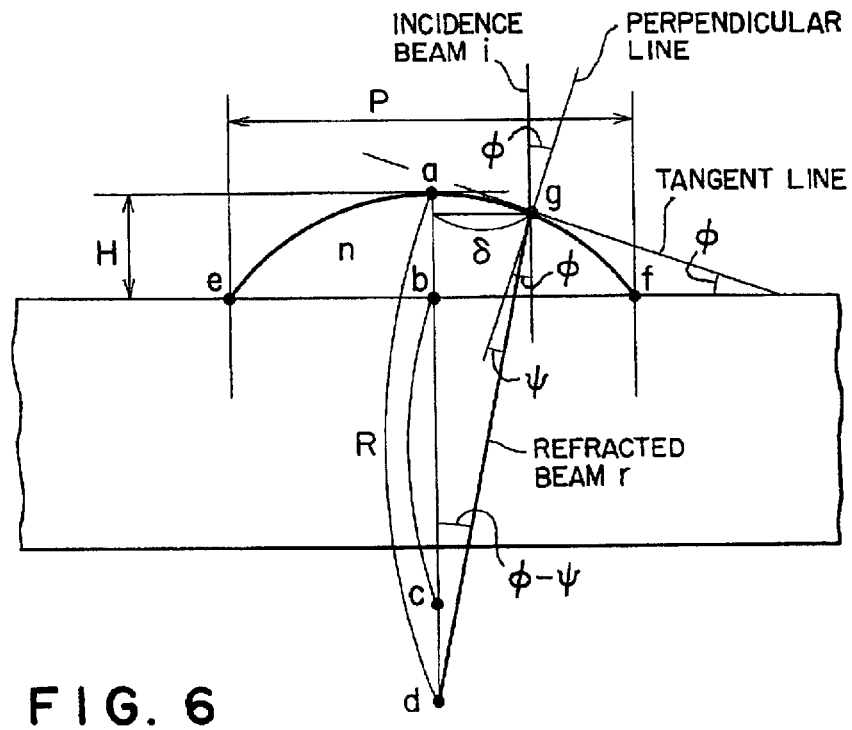
FIG. 6 is a view for explaining a refraction of a beam incident on a center portion of a lens surface.

FIG. 6 is a view for explaining a refraction of a beam incident on a vicinity of a center portion of a lens surface. When an angle formed by a tangential line at a point g away from a center a of the lens surface by a minute distance δ in a plane direction of the lenticular lens sheet (in the right direction in the drawing) and an upper surface of the transparent substrate 2 (the lenticular lens sheet itself) is represented by φ, with respect to an incidence beam i on the point g and a refracted beam r by the point g, the following Snell's expression is satisfied.

$\sin \phi = n \sin \Phi$

Herein, the following relationship is satisfied.

$\sin \phi = \delta/R$

Thus, the following expression is obtained.

$\sin \Phi = \delta/nR$

Herein, Φ is an angle formed by the refracted beam r and a perpendicular line at the point g of the lens surface. Thus, an angle formed by an optical axis of the lens (which extends through the center a of the lens surface and the focal point a of the beam incident on the edge portion of the lens surface) and the refracted beam at the point d is φ−Φ.

Herein, if the minute distance δ is very small, the following expressions are satisfied.

$\sin \phi = \phi$, $\sin \Phi = \Phi$

Thus, the following expression is obtained.

$\phi - \Phi = \sin \phi - \sin \phi = \delta/R - \delta/nR = \delta(1/R - 1/nR)$ Then, with respect to the distance $L_{ad}$ from the center a of the lens surface to the point d, if the minute distance δ is very small, the following expression is satisfied.

$\delta/L_{ad} = \sin(\phi - \Phi) = \phi - \Phi = \delta(1/R - 1/nR)$

Thus, the following expression is obtained.

$L_{ad} = 1/(1/R - 1/nR) = nR/(n-1)$

If the thickness of the lens is represented by H, the following expression is satisfied.

$L_{ad} = L_{bd} + H$

In order for the focal point d of the beam incident on the vicinity of the center of the lens surface to be further from the lens surface than the focal point a of the beam incident on the edge portion of the lens surface, the following expression has to be satisfied.

$L_{bc} < L_{bd} = L_{ad} - H$

Herein, as described above, the following expressions have been obtained.

$L_{bc} = (P/2) \times \tan\{\sin^{-1}(\sin \theta/n) + \pi/2 - \theta\}$ $L_{bd} = L_{ad} - H = nR/(n-1) - H$ Thus, $L_{bc} < L_{bd}$ are multiplied by 2/P to introduce the following expression.

$\tan\{\sin^{-1}(\sin \theta/n) + \pi/2 - \theta\} < 2 \times \{nR/(n-1) - H\}/P$ In addition, in the lenticular lens sheet 1 of this embodiment, as described above, focal points (focal lengths) by respective points on the lens surface are different dependently on the respective points on which the incidence beam may be incident. Thus, the embodiment can achieve a wider view angle, compared with a conventional lenticular lens sheet. In addition, if the curvature radius at the center portion of the lens surface is relatively increased, the gain at a front area can be freely enhanced.

For example, a ½ diffusion angle (an angle range that can obtain ½ luminance with respect to luminance at a front area of the screen) can be a range of ±15° to ±40° from the front area (angle: 0°), and a ¹⁄₁₀ diffusion angle (an angle range that can obtain ¹⁄₁₀ luminance with respect to luminance at the front area of the screen) can be a range to which the ½ diffusion angle is widened by ±10° or more. The ¹⁄₁₀ diffusion angle can be a range to which the ½ diffusion angle is widened by ±30°, to the maximum.

In the conventional lenticular lens sheet, a ½ diffusion angle is designed to be relatively wide. However, at a range outside the ½ diffusion angle, the gain rapidly declines. On the other hand, in the lenticular lens sheet of this embodiment, by adjusting a width of an area in the vicinity of the center of the lens surface that has a greater focal length, an angle range of achieving a higher gain can be adjusted widely or narrowly, freely.

In addition, the conventional lens sheet is designed in such a manner that the focal point is concentrated to a point in the vicinity of the black stripe. Thus, a refracted beam that has been greatly refracted by an edge portion of the lens surface tends to be blocked by the black stripe. More concretely, at a range over ±50°, the gain rapidly declines.

On the other hand, in the embodiment, the black stripe (light blocking portion) is formed near to the focal point of the refracted beam by the edge portion of the lens surface. Thus, in a wider angle range, it can be basically avoided that the refracted beam is blocked by the black stripe. As a result, both widening the ¹⁄₁₀ diffusion angle and dispelling rapid decline of the gain can be achieved.

The lenticular lens sheet of this embodiment is effective for any lens pitch P. If an image source is an LCD panel or a DMD panel, the lens pitch P can be a fine pitch correspondingly to the pitch of the image source. In the case, it can be prevented that a moire pattern appears, which is more preferable. The lower limit of the lens pitch P is about 0.001 mm. More preferably, the lens pitch P is 0.01 mm. If the lens pitch P is smaller than the lower limit, optical interference between beams may happen, which is not preferable. If the lens pitch P is greater than 0.3 mm, a moire pattern tends to appear, which is not preferable.

The light blocking portion in the lenticular lens sheet of this embodiment is formed with a greater width (at a high existence rate) to the lens pitch, compared with the conventional one.

If focal points by all points on a lens surface are concentrated to one focal point in the vicinity of the light blocking portion as the conventional lenticular lens sheet, the light blocking portion has to be formed at a lower existence rate to the lens pitch in such a manner that the refracted beam by an edge portion of the lens surface is not blocked. However, the lenticular lens sheet of the embodiment is designed in such a manner that the focal points by the respective points on the lens surface are continuously varied (different). Thus, except narrow boundary areas between adjacent lens surfaces, all the refracted beams can outgo through the opening part of the light blocking portion.

For the embodiment, it is preferable that the existence rate of the light blocking portion to the lens pitch is 40% to 90%. If it is lower than 40%, the reflection-preventing effect against external light at the outgoing plane is not sufficient. If it is over 90%, efficiency of a register operation (a positioning operation) is deteriorated, since positional accuracy in forming the light blocking portion has to be high. Thus, degree of freedom in designing the lenticular lens may be limited, or a projecting system may be subjected to some restrictions. In addition, If a light diffusion loss at the lenticular lens sheet becomes more, transmissivity therethrough may be remarkably deteriorated. In addition, if it is over 90%, the effect in enhancing contrast is hardly great.

The lenticular lens sheet of the invention can have substantially the same structure as the conventional lenticular lens sheet, except the shape of the lens surface and the position in which the light blocking portion is formed. Thus, the lenticular lens sheet of the invention can be manufactured by substantially the same method as for the conventional lenticular lens.

As shown in FIG. 1, the lenticular lens sheet 1 has a layered structure wherein the lens layer 3 is layered on the transparent substrate 2. Alternatively, the lenticular lens sheet 1 can be formed as one body wherein the transparent substrate 2 and the lens layer 3 are united.

The layered structure as shown in FIG. 1 can be manufactured by: sandwiching a liquid transparent resin between a patterned board or a patterned roller, which has a pattern reverse to the shape of the lenticular lens surfaces 3a, and the transparent substrate 2; then hardening the transparent resin to stick the same to the transparent substrate 2; and then pealing off the layered body of the transparent substrate 2 and the hardened lens layer 3 from the patterned board or the patterned roller.

Especially, if a patterned roller is used and an ionization radiation hardening resin composite such as a ultraviolet ray hardening resin composite is used as the liquid transparent resin, the hardening step of the resin can be completed in an instant by radiating the ionization radiation. In the case, since the lens layer 3 is formed by the ionization radiation hardening resin composite being hardened, the lens layer 3 is solid and strong.

The light blocking portion 5 can be formed by various methods, which are conventionally known. In detail, the light blocking portion 5 can be formed by printing, transcribing, or the like. In addition, the light blocking portion 5 can be formed by using the lens surfaces that are included in the lenticular lens sheet.

For example, a composite whose state can be changed (for example, a composite that can be hardened by a radiation of ultraviolet rays) is applied on the outgoing surface having no lens surface. Then, the adhesive characteristic of the composite is partly changed or removed (via hardening or decomposition) by partly changing the state of the composite, for example by radiating ultraviolet rays or the like through the lens surfaces. After that, the light blocking material is applied onto the outgoing surface by printing, transcribing, or the like, so that the light blocking material sticks to only the composite keeping the adhesive characteristic.

Alternatively, there is a method wherein a laser beam is radiated through the lens surfaces of the lenticular lens sheet to partly remove a material that has been layered on the outgoing surface in advance.

In addition, as a method of radiating a beam through the lens surfaces, there is a method of: applying an emulsion layer used for a silver-salt photo onto the outgoing surface, exposing the emulsion layer to light through the lens surfaces and developing the same, and forming a light blocking portion including blackened silver that is the developed silver-salt emulsion layer and that is located at predetermined parts. In the case, the development should be a reversal development or an auto-positive-film should be used in such a manner that light-exposed parts can be blackened.

The light blocking portion 5 can be formed by any of the above methods. However, if the light blocking portion 5 is formed by using the lens surfaces that are included in the lenticular lens sheet, register accuracy (positional accuracy) between the respective lens surfaces and the light blocking portion can be enhanced for the lenticular lens sheet.

In the lenticular lens sheet 1 of the embodiment, as shown in FIG. 3a, the lens surfaces 3a can be formed only on one side i.e. only on a backside. However, in addition to the lens surfaces 3a on the backside, lens surfaces 3'a can be formed on an observed side i.e. On a front side.

Preferably, the former lenticular lens sheet 1 is used for forming a CRT screen. The latter lenticular lens sheet 1 is preferably used when an image source is a single LCD panel or a single DMD panel.

The lenticular lens sheet 1 of the embodiment can be used as a screen as it is. A condensing lens such as a Fresnel convex lens may be arranged above the backside of the lenticular lens sheet 1. Alternatively, a light-diffusion element may be added to the lenticular lens sheet 1 in order to provide a screen having luminance distribution not only in a horizontal direction but also in a vertical direction.

As the light-diffusion element, another lenticular lens layer having a plurality of lenticular lenses arranged in the vertical direction, which is different from the right-and-left direction in which the plurality of lenticular lenses in the lenticular lens sheet 1 are arranged on the backside thereof, can be used. In the case, the lenticular lens layer having the lenticular lenses arranged in the vertical direction may be formed on the front surface of the lenticular lens sheet 1. Alternatively, another lenticular lens sheet having the lenticular lenses arranged in the vertical direction may be combined.

With respect to the light-diffusion element, besides adding the lenses, it is also effective to disperse particles having a light-diffusion effect into a or more materials for the lenticular lens sheet. For example, suitable particles having a light-diffusion effect may be dispersed into the transparent substrate 2 and/or the lenticular lens layer 3.

In addition, as shown in FIG. 4, a light-diffusion sheet that may be obtained by kneading particles having a light-diffusion effect or a light-diffusion sheet (film) that may be obtained by applying a paint, into which particles having a light-diffusion effect are dispersed, to a transparent film or another light-diffusion sheet can be layered on the front surface of the lenticular lens sheet shown in FIG. 3a or FIG. 3b.

If a light-diffusion sheet is layered, particles having a light-diffusion effect don't have to be introduced separately in forming the lenticular lens sheet. In addition, since a light-diffusion sheet can be used for the lenticular lens sheet after the light-diffusion sheet itself has been made independently, it is easy to control the light-diffusion effect for the lenticular lens sheet by changing the characteristic of the light-diffusion sheet or the like.

Next, lenticular lens sheets that have been actually made are explained.

(Embodiment 1)

A lenticular lens sheet including a lenticular lens layer was obtained wherein: a lens pitch of lenticular lenses is 0.1 m, a sectional contour of each lenticular lens is elliptic, a lateral diameter (in a direction of the lens pitch) of each lenticular lens is 0.055 mm, and a vertical diameter of each lenticular lens is 0.045 mm. The refractive index of each lenticular lens is 1.55. Focal points by respective points on each lenticular lens are located away from a top of each lenticular lens by a range of 0.125 mm to 0.18 mm.

Then, a light blocking portion was formed at a level away from the top of each lenticular lens by 0.145 mm, by printing. In addition, a light-diffusion plate having a thickness of 2 mm was layered thereon.

As the light-diffusion plate, used is a base material having a refractive index of 1.49 into which light-diffusion particles, whose refractive index is 1.55 and whose average diameter is 12 micron, are dispersed by kneading at an addition rate of 1.5 weight % in forming the plate.

(Embodiment 2)

Another lenticular lens sheet was obtained. The lenticular lens sheet includes a layered body of: a lenticular lens layer consisting of hardened ultraviolet ray hardening resin composite whose refractive index is 1.55; and a transparent film whose thickness is 0.13 mm. A lens pitch of lenticular lenses is 0.1 mm, a sectional contour of each lenticular lens is elliptic, a lateral diameter (in a direction of the lens pitch) of each lenticular lens is 0.055 mm, and a vertical diameter of each lenticular lens is 0.045 mm. Focal points by respective points on each lenticular lens are located away from a top of each lenticular lens by a range of 0.13 mm to 0.19 mm.

Then, a silver-salt photosensitive material (layer) having a thickness of 5 μm was layered on an exposed surface of the transparent film. Then, a light blocking portion was formed in the silver-salt photosensitive material by light exposure and development. In addition, a light-diffusion plate having a thickness of 2 mm is layered thereon.

As the light-diffusion plate, used is a base material having a refractive index of 1.53 into which light-diffusion particles, whose refractive index is 1.55 and whose average diameter is 10 micron, are dispersed by kneading at an addition rate of 5 weight % in forming the plate.

(Comparison)

Another lenticular lens sheet including a lenticular lens layer was obtained as a comparison. The lenticular lens layer consists of hardened ultraviolet ray hardening resin composite whose refractive index is 1.5. A lens pitch of lenticular lenses is 0.1 mm, a sectional contour of each lenticular lens is elliptic, a lateral diameter (in a direction of the lens pitch) of each lenticular lens is 0.059 mm, and a vertical diameter of each lenticular lens is 0.079 mm. Focal points by respective points on each lenticular lens are concentrated to one point located away from a top of each lenticular lens by 0.132 mm. A light blocking portion was formed at a level including the concentrated focal point by printing.

Figure 7:
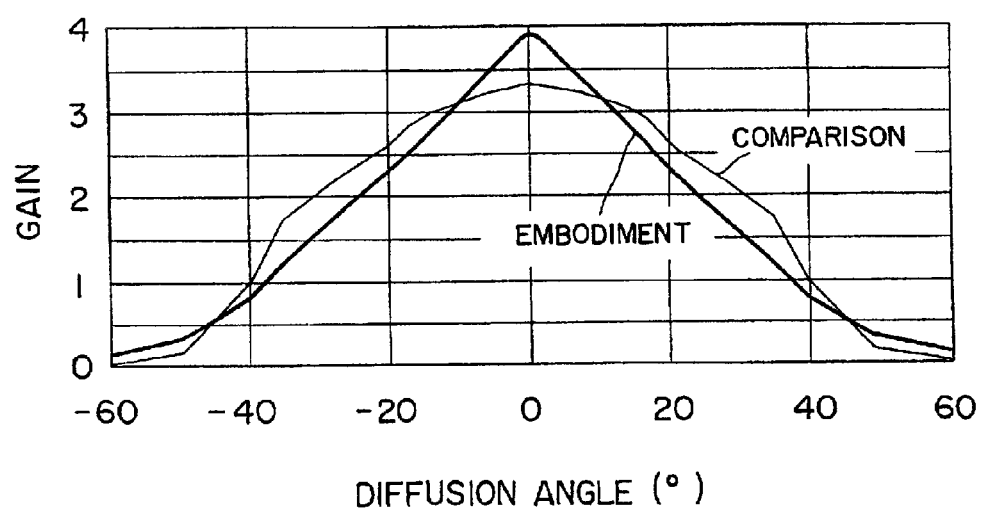
FIG. 7 is a graph showing diffusion-angle characteristics of a conventional lenticular lens sheet and embodiment of a lenticular lens sheet according to the invention.

FIG. 7 is a graph showing a relationship between gains and diffusion angles by the lenticular lens sheets of the embodiments 1 and 2 and the comparison. The lenticular lens sheets of the embodiments 1 and 2 have substantially the same characteristic, so that the lenticular lens sheets of the embodiments 1 and 2 are shown as a common embodiment. In the lenticular lens sheet of the embodiment, the ½ diffusion angle is restricted to about ±20°. In addition, the 1/10 diffusion angle is extended to about ±45° or more. Furthermore, the gain gently declines over the 1/10 diffusion angle, so that a cutoff doesn't happen. In addition, a beam incident on the center portion of the lens surface crosses with the center axis (optical axis) after the beam passes through the light blocking portion, that is, refraction of the beam is restricted. Thus, the peak gain is high.

On the other hand, in the lenticular lens sheet of the comparison, the ½ diffusion angle is extended to about ±40°. However, the peak gain is low. In addition, the gain rapidly declines over about ±40°. The 1/10 diffusion angle has only a very small range, and a cutoff happens.

With respect to respective measured values, the ½ diffusion angle of the embodiment was about ±24°, the 1/10 diffusion angle of the embodiment was about ±43°, the ½ diffusion angle of the comparison was about ±41°, and the 1/10 diffusion angle of the comparison was about ±45°.

What is claimed is:

1. A lenticular lens sheet comprising;
    an incidence plane that has a plurality of lens surfaces, and
    an outgoing flat plane,
    wherein a focal length at a center portion of each of the plurality of lens surfaces is longer, and a focal length at an edge portion of each of the plurality of lens surfaces is shorter.

2. A lenticular lens sheet according to claim 1, wherein:
    a pitch of an arrangement of the plurality of lens surfaces is 0.001 mm to 0.3 mm.

3. A lenticular lens sheet according to claim 1, wherein:
    a lens part defining the plurality of lens surfaces is layered onto a transparent substrate.

4. A lenticular lens sheet according to claim 3, wherein:
    the lens part defining the plurality of lens surfaces consists of an ionization radiation hardening resin.

5. A lenticular lens sheet, comprising:
    an incidence plane that has a plurality of lens surfaces, and
    an outgoing plane,
    wherein a focal length at a center portion of each of the plurality of lens surfaces is longer, a focal length at an edge portion of each of the plurality of lens surfaces is shorter, and
    in each of the plurality of lens surfaces, focal lengths at respective points from the center portion to the edge portion shorten in order from the center portion toward the edge portion.

6. A lenticular lens sheet, comprising:
    an incidence plane that has a plurality of lens surfaces, and
    an outgoing plane,
    wherein a focal length at a center portion of each of the plurality of lens surfaces is longer, a focal length at an edge portion of each of the plurality of lens surfaces is shorter, and
    in each of the plurality of lens surfaces, focal lengths at respective points from the center portion to the edge portion continuously shorten from the center portion toward the edge portion.

7. A lenticular lens sheet according to claim 6, wherein:
each of the plurality of lens surfaces has a sectional contour consisting of a convex curve.

8. A lenticular lens sheet, comprising:
an incidence plane that has a plurality of lens surfaces, and
an outgoing plane,
wherein a focal length at a center portion of each of the plurality of lens surfaces is longer, a focal length at an edge portion of each of the plurality of lens surfaces is shorter, and in a sectional contour of each of the plurality of lens surfaces,
when a curvature radius at the center portion of each of the plurality of lens surfaces is represented by R,
an angle formed by a tangential line at the edge portion of each of the plurality of lens surfaces and a tangential line at the center portion of each of the plurality of lens surfaces is represented by θ,
a pitch of an arrangement of the plurality of lens surfaces is represented by P, and
a thickness and a refractive index of a lens part defining the plurality of lens surfaces are represented by H and n, a following expression $$\tan\{\sin^{-1}(\sin\theta/n)-\theta+(\pi/2)\} < 2\times\{n\times R/(n-1)-H\}/P$$

is satisfied.

9. A lenticular lens sheet, comprising:
an incidence plane that has a plurality of lens surfaces, and an outgoing plane,
wherein a focal length at a center portion of each of the plurality of lens surfaces is longer, a focal length at an edge portion of each of the plurality of lens surfaces is shorter,
a light blocking portion is formed in a thickness direction of the lenticular lens sheet and in a planar direction of the lenticular lens sheet in such a manner that at least a beam through the edge portion of each of the plurality of lens surfaces is not blocked by the light blocking portion, and
the light blocking portion is formed between a level of a focal point corresponding to the center portion of each of the plurality of lens surfaces and a level of a focal point corresponding to the edge portion of each of the plurality of lens surfaces, with respect to the thickness direction of the lenticular lens sheet.

10. A lenticular lens sheet according to claim 9, wherein:
a width of the light blocking portion is 40% to 90% of a pitch of an arrangement of the plurality of lens surfaces.

11. A lenticular lens sheet according to claim 9, wherein:
the light blocking portion consists of a silver-salt photo emulsion layer that has been developed.

12. A lenticular lens sheet, comprising:
an incidence plane that has a plurality of lens surfaces, and
an outgoing plane,
wherein a focal length at a center portion of each of the plurality of lens surfaces is longer, a focal length at an edge portion of each of the plurality of lens surfaces is shorter, a light blocking portion is formed in a thickness direction of the lenticular lens sheet and in a planar direction of the lenticular lens sheet in such a manner that at least a beam through the edge portion of each of the plurality of lens surfaces is not blocked by the light blocking portion, and
when parallel beams are incident on each of the plurality of lens surfaces and luminance at a front area of the outgoing plane is represented by B, an area having luminance not less than B/2 includes ±15° to ±40° from the front area, and
an area having luminance not less than B/10 further includes ±15° from the area having luminance not less than B/2.

13. A screen comprising a lenticular lens sheet, the lenticular lens sheet including;
an incidence plane that has a plurality of lens surfaces, and
an outgoing flat plane,
wherein a focal length at a center portion of each of the plurality of lens surfaces is longer, and a focal length at an edge portion of each of the plurality of lens surfaces is shorter.

14. A screen according to claim 13, wherein:
the lenticular lens sheet has a light-diffusion effect.

15. A screen according to claim 13, wherein:
a light-diffusion element is further provided at least at an outgoing part of the screen.

16. A screen according to claim 15, wherein:
the light-diffusion element is a sheet in which a light-diffusion agent has been dispersed.

* * * * *